United States Patent [19]
Isono et al.

[11] Patent Number: 5,263,335
[45] Date of Patent: Nov. 23, 1993

[54] OPERATION CONTROLLER FOR AIR CONDITIONER

[75] Inventors: Kazuaki Isono; Toshihiro Tanaka; Seiji Kubo; Hidenori Ishioka; Hideaki Nagatomo; Katsuyuki Aoki; Yasuo Imaki; Tomofumi Tezuka; Isao Funayama, all of Shizuoka, Japan

[73] Assignee: Mitsubishi Denki Kabushiki Kaisha, Tokyo, Japan

[21] Appl. No.: 912,100

[22] Filed: Jul. 10, 1992

[30] Foreign Application Priority Data

Jul. 12, 1991 [JP] Japan ................... 3-172450
Mar. 24, 1992 [JP] Japan ................... 4-65889

[51] Int. Cl.5 .............................................. F25B 1/00
[52] U.S. Cl. ..................................... 62/228.4; 62/229; 62/209
[58] Field of Search ............... 62/228.4, 157, 231, 62/229, 208, 209; 236/46 F

[56] References Cited

U.S. PATENT DOCUMENTS

| 4,364,237 | 12/1982 | Cooper et al. | 62/228.4 |
| 4,722,196 | 2/1988 | Ishikawa | 62/228.4 |
| 4,850,203 | 7/1989 | Okada et al. | 62/228.4 |
| 5,099,652 | 3/1992 | Iida et al. | 62/228.4 |

FOREIGN PATENT DOCUMENTS

| 59-34935 | 8/1984 | Japan . |
| 60-12532 | 4/1985 | Japan . |
| 60-18899 | 5/1985 | Japan . |
| 2-93256 | 4/1990 | Japan . |

*Primary Examiner*—Harry B. Tanner
*Attorney, Agent, or Firm*—Oblon, Spivak, McClelland, Maier & Neustadt

[57] ABSTRACT

An operation controller for an air conditioner designed to decrease a difference between an ambient temperature and a set temperature by varying the number of revolutions of a compressor, includes: a means for calculating an operation ratio of the compressor; and a means for determining the range of varying an operation frequency of the compressor in accordance with the operation ratio.

12 Claims, 19 Drawing Sheets

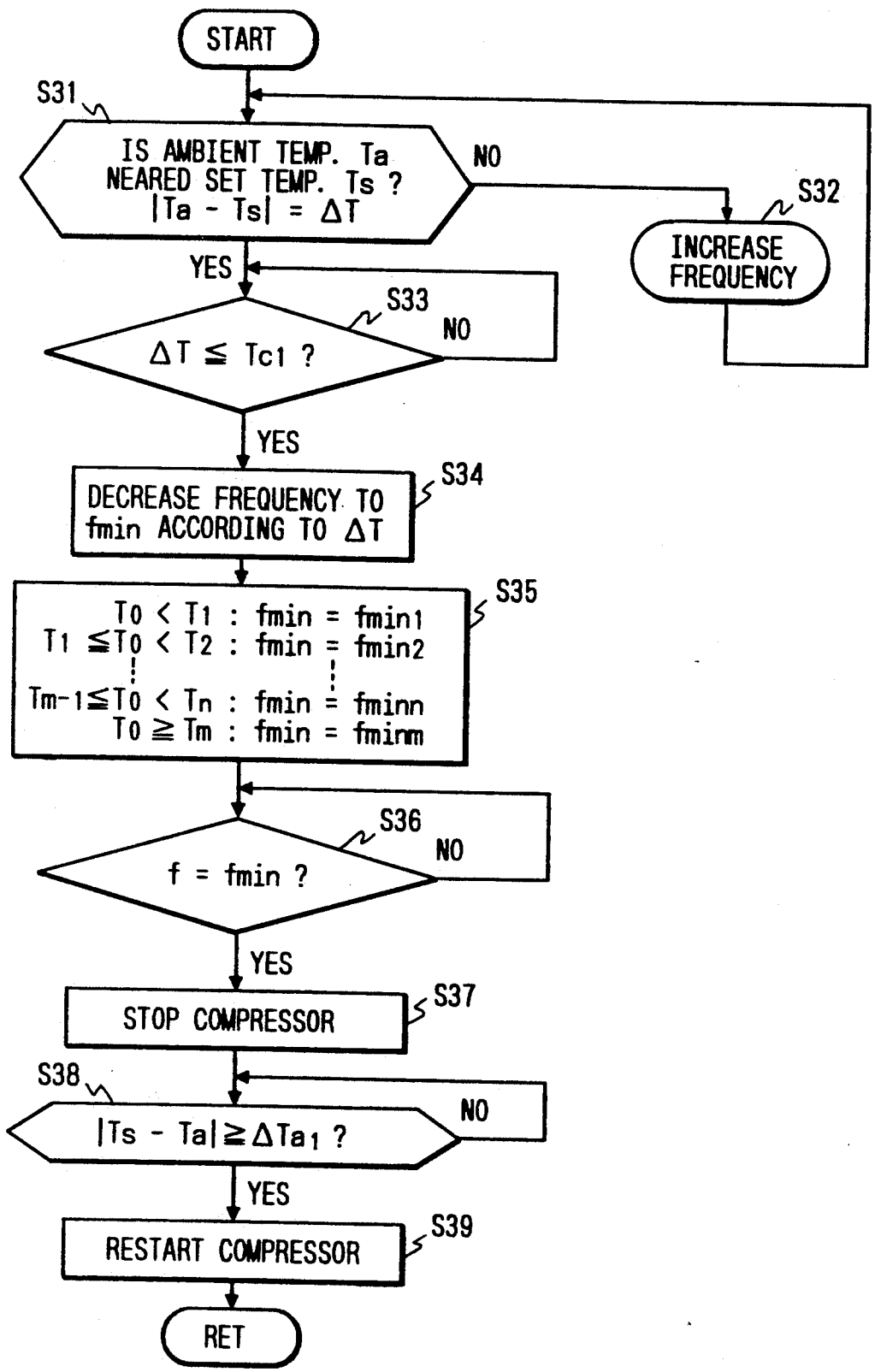

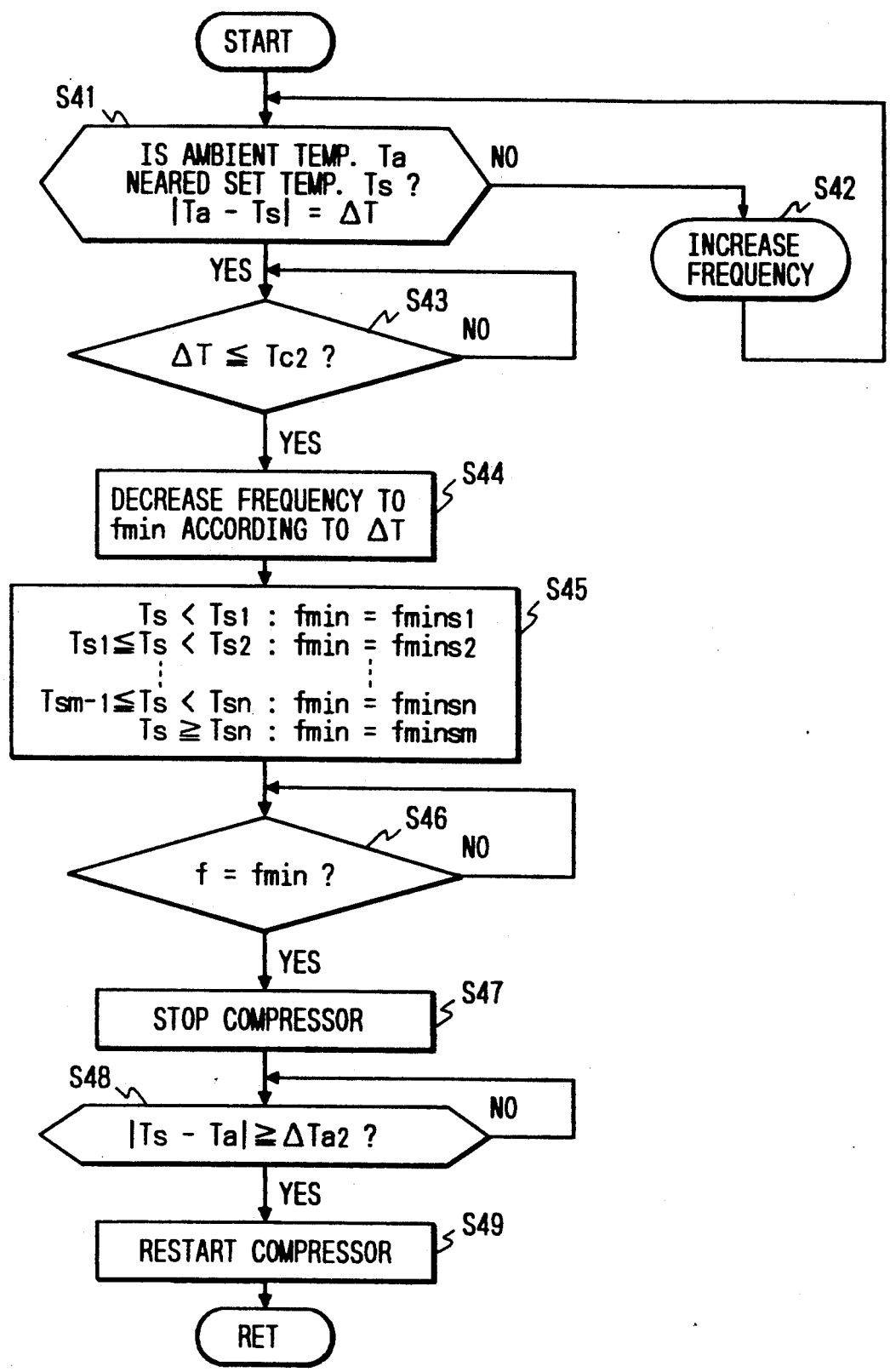

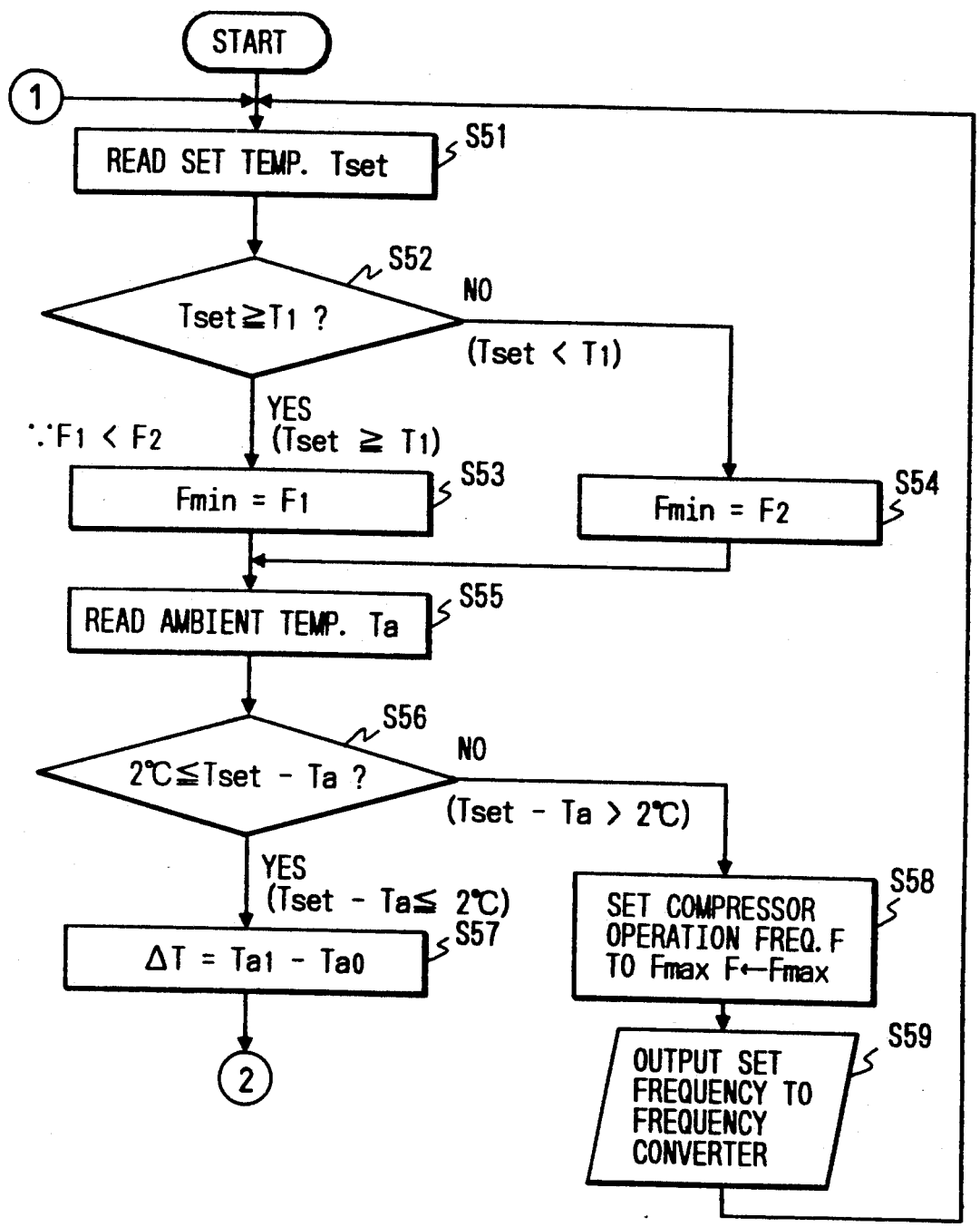

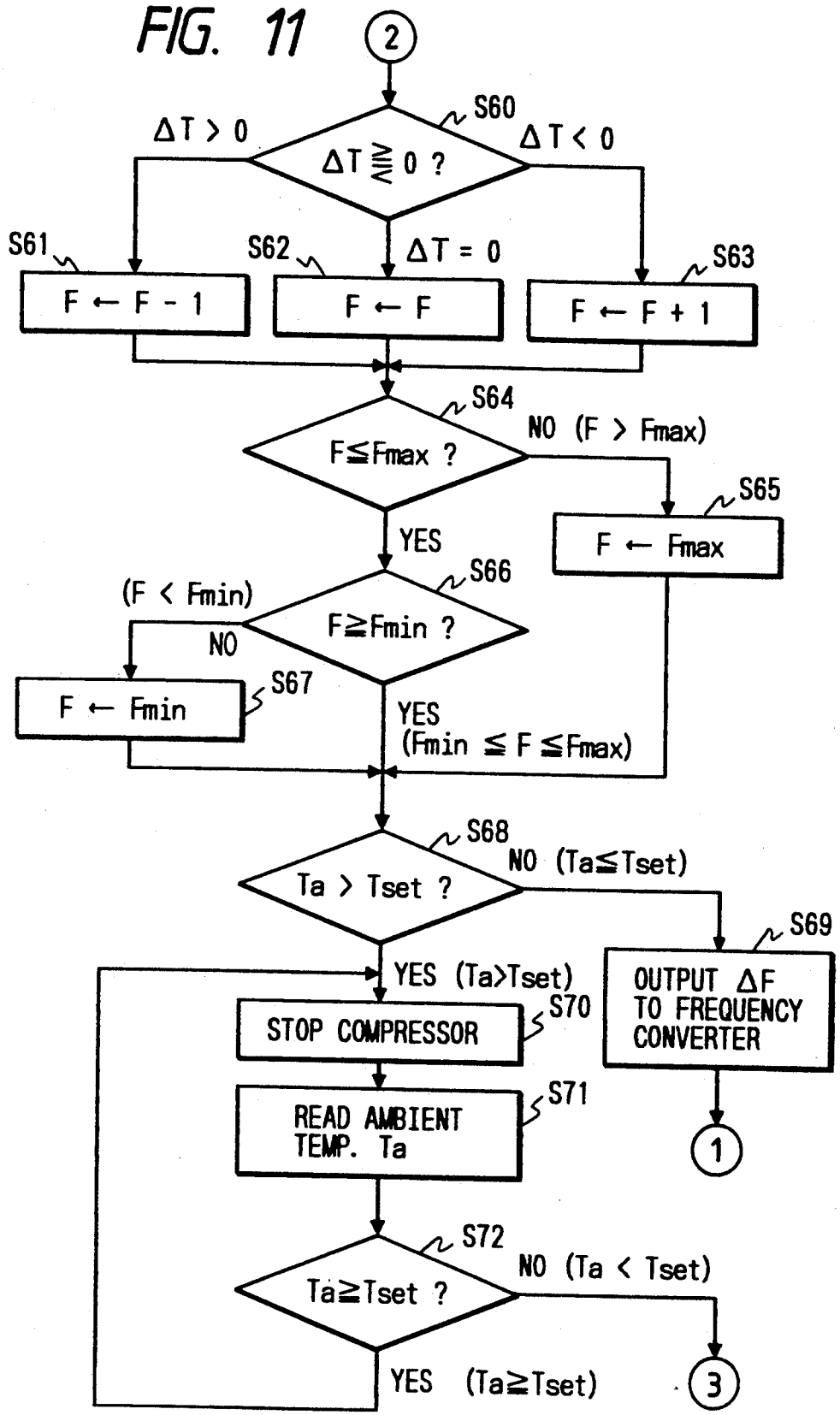

| TEMPERATURE RANGES | FREQUENCY SET VALUE (Hz) |
|---|---|
| ZONE A | 75 |
| ZONE B | 65 |
| ZONE C | 55 |
| ZONE D | 45 |
| ZONE E | 35 |
| ZONE F | STOP |

OPERATION CONTROLLER FOR AIR CONDITIONER

BACKGROUND OF THE INVENTION

The invention relates to an operation controller for an air conditioner capable of varying the number of revolutions of a compressor thereof in accordance with the air conditioning load.

FIGS. 20 to 24 show a conventional air conditioner disclosed in, e.g., Japanese Examined Publication No. 12532/1985. FIG. 20 is a block diagram showing a configuration of the conventional air conditioner; FIG. 21 is a front view of a panel portion of a display operation section of the conventional air conditioner; FIG. 22 is a characteristic diagram showing a relationship between temperature differences and zones in the conventional air conditioner; and FIG. 23 is a time chart showing an operation of the conventional air conditioner. In FIG. 20, a power supply 1 supplies ac power to a rectifier circuit 2, where the ac power from the power supply 1 is rectified to dc power. The dc power outputted from the rectifier circuit 2 is applied to a frequency converter 3. The frequency converter 3 can continuously convert the output frequency in the range of from about 25 to 80 Hz by a digital control signal, thereby varying the rotational speed of a compressor 4 in the range of from 1400 to 4500 rpm. On the other hand, the digital control signal applied to the frequency converter 3 is outputted by a controller 5. The controller 5 applies to a microprocessor (not shown) an operation signal outputted from a display operation section 6, a signal of an ambient temperature detected by a temperature sensor 8, and a signal of a cooling medium condensing temperature detected by a temperature sensor 9 to operate a load 7 such as a four-way valve and a fan motor by executing arithmetic and logic operations in accordance with predetermined programs. At the same time, the controller 5 delivers a set frequency signal to the frequency converter 3 and displays operation conditions of the compressor 5 on an LED display panel on the display operation section 6.

As shown in FIG. 21, the display operation section 6 includes: a bar display 11 that displays the number of revolutions of the compressor 4 in the form of performance level; a temperature setting unit 12 that sets the ambient temperature and outputs a temperature set signal; a selector switch 13 that selects the intensity of an inside fan (not shown) and outputs a fan intensity set signal; an operation stop switch 14 that stops the operation of the air conditioner; selector switches 15, 16 that switch between the cooling and the heating operation of the air conditioner and output an operation instruction signal; and display LEDs 17, 18 that display the operation conditions of the cooling or the heating operation of the air conditioner.

As described above, the temperature set signal of the temperature setting unit 12 and the fan intensity set signal of the selector switch 13, and operation instruction signals of the operation stop switch 14, the selector switches 15, 16, all being outputted from the display operation section 6, are applied to the controller 5.

The controller 5 is mainly formed of a microcomputer, and is designed to operate in correspondence to microcomputer programs. Accordingly, the controller can output with ease a set frequency signal in accordance with the difference between an ambient temperature detected by the temperature sensor 8 and a temperature set by the temperature setting unit 12, so that the number of revolutions of the compressor 4 is controlled so as to match the air conditioning load.

While an exemplary correspondence between differences between ambient temperatures and set temperatures and frequency set signals are shown, operation conditions thereof will be described with reference to FIGS. 22 and 23. As shown in FIG. 22, the variable range of differences between ambient temperatures and the set temperatures and of differences in frequency set signal is divided into six (6) zones A to F for each of the cases where ambient temperatures (or differences between ambient temperatures and set temperatures) depict a downward gradient and an upward gradient. More specifically, when the ambient temperature is in the downward gradient region X, a range in which the ambient temperature is 1° C. or more higher than the set temperature is designated as zone A, a range in which the ambient temperature is 0.5° to 1.0° C. higher than the set temperature is designated as zone b, a range in which the ambient temperature is 0° to 0.5° C. higher than the set temperature is designated as zone C, a range in which the ambient temperature is 0° to 0.5° C. lower than the set temperature is designated as zone D, a range in which the ambient temperature is 0.5 to 1.0° C. lower than the set temperature is designated as zone E, and a range in which the ambient temperature is 1° C. or more lower than the set temperature is designated as zone F.

When the ambient temperature is in the downward gradient region Y, a range in which the ambient temperature is 1.5° C. or more higher than the set temperature is designated as zone A, a range in which the ambient temperature is 1.0° to 1.5° C. higher than the set temperature is designated as zone B, a range in which the ambient temperature is 0.5° to 1.0° C. higher than the set temperature is designated as zone C, a range in which the ambient temperature is 0° to 0.5° C. higher than the set temperature is designated as zone D, a range in which the ambient temperature is 0° to 0.5° C. lower than the set temperature is designated as zone E, and a range in which the ambient temperature is 0.5° C. or more lower than the set temperature is designated as zone F. Here, zone D is particularly designated as a control target zone. These temperature ranges and frequency set signals are made to correspond as shown in FIG. 24. Such correspondence means that if the difference between the ambient temperature and the set temperature is in zone A, the controller 5 applies a frequency set signal of 75 Hz to the frequency converter 3, whereas if the difference between the ambient temperature and the set temperature is in zone F, the controller 5 applies a compressor stop instruction to the frequency converter 3. FIG. 23 shows changes in ambient temperature expressed in terms of differences between the ambient temperature and the set temperature when the air conditioner is driven for cooling, together with changes in frequency. In FIG. 23, when the difference between the ambient temperature and the set temperature is in zone A (1.0° C. or more), the ambient temperature at which a frequency set signal of 75 Hz is applied is decreased rapidly. When the difference moves to zone B (less than 1.0° C.), a frequency set signal of 65 Hz is applied to the frequency converter 3. As the difference sequentially drops to be found in zone D, a frequency set signal of 45 Hz is applied to the frequency converter 3. As long as the ambient temperature is in the downward gradient as described above and is maintained lower than the set temperature by 0° to 0.5° C., the frequency set signal of 45 Hz is continuously applied. If the ambient temperature is so increased afterwards that the ambient temperature is higher than the set temperature by 0° to 0.5° C., then the ambient temperature now belongs to the upward gradient zone D. Thus, a frequency set signal of 45 Hz is similarly applied continuously.

More specifically, since there is a difference of 0.5° C. between the ambient temperature and the set temperature in the downward gradient, this difference acts as a hysteresis. Once the ambient temperature has reached the target temperature, the air conditioning operation is performed with no frequent change in the set frequency taking place.

Since the operation controller for the conventional air conditioner determines the operation frequency of the compressor so that the operation frequency matches an ambient load, if the load is small, the controller operates the air conditioner at the minimum frequency at all times. And this does not ensure that the air conditioner is always operated at the operation frequency of optimal efficiency.

SUMMARY OF THE INVENTION

The invention has been made to overcome the above problem. Accordingly, the object of the invention is to provide an operation controller for an air conditioner which is capable of operating the air conditioner at operation frequencies, each providing the best efficiency, in accordance with the ambient load, or which is capable of controlling the operation so that the operation efficiency can be improved at low frequencies.

To achieve the above object, a first aspect of the invention is applied to an operation controller for an air conditioner, which controls the number of revolutions of a compressor so that a difference between an ambient temperature and a set temperature can be decreased. Such an operation controller includes: a means for calculating an operation ratio of the compressor; and a means for determining the range of varying an operation frequency of the compressor in accordance with the operation ratio.

A second aspect of the invention is applied to an operation controller for an air conditioner, which has an invertor-driven compressor. Such an operation controller includes a control means for varying a minimum rotational frequency of the compressor in accordance with an outside air temperature.

A third aspect of the invention is applied to an operation controller for an air conditioner controlling the performance of the air conditioner by varying the number of revolutions of a compressor. Such an operation controller includes: a means for calculating an operation ratio which is a ratio of an on time to an off time of the compressor, a means for selecting a minimum operation frequency and calculating an operation ratio of the compressor in accordance with a set temperature; and a means for correcting the minimum operation frequency so that the operation ratio becomes suitable for the minimum operation frequency.

The operation controller for the air conditioner according to the first aspect of the invention corrects the minimum frequency so as to decrease if the operation efficiency is too low.

The operation controller for the air conditioner according to the second aspect of the invention controls the minimum frequency so as to provide an optimal COP.

The operation controller for the air conditioner according to the third aspect of the invention provides optimal efficiencies to various loads by repeating the turning on and off of the air conditioner at a minimum operation frequency that can maximize the efficiency suitable for a set temperature to balance the operation with the ambient load, and by calculating the operation ratio to correct the minimum operation frequency so that the operation ratio can be optimal to the minimum operation frequency.

BRIEF DESCRIPTION OF THE DRAWINGS

FIG. 7 is a flowchart for the operation controller for the air conditioner shown in FIG. 6;

FIG. 9 is a flowchart for the operation of an operation controller for an air conditioner, which is a third embodiment of the invention;

FIG. 10 is a flowchart for the operation of an operation controller for the air conditioner, which is a fourth embodiment of the invention;

FIG. 11 is a flowchart for the operation of the operation controller for the air conditioner according to the fourth embodiment of the invention;

DETAILED DESCRIPTION OF THE PREFERRED EMBODIMENTS

First Embodiment

Figure 1:
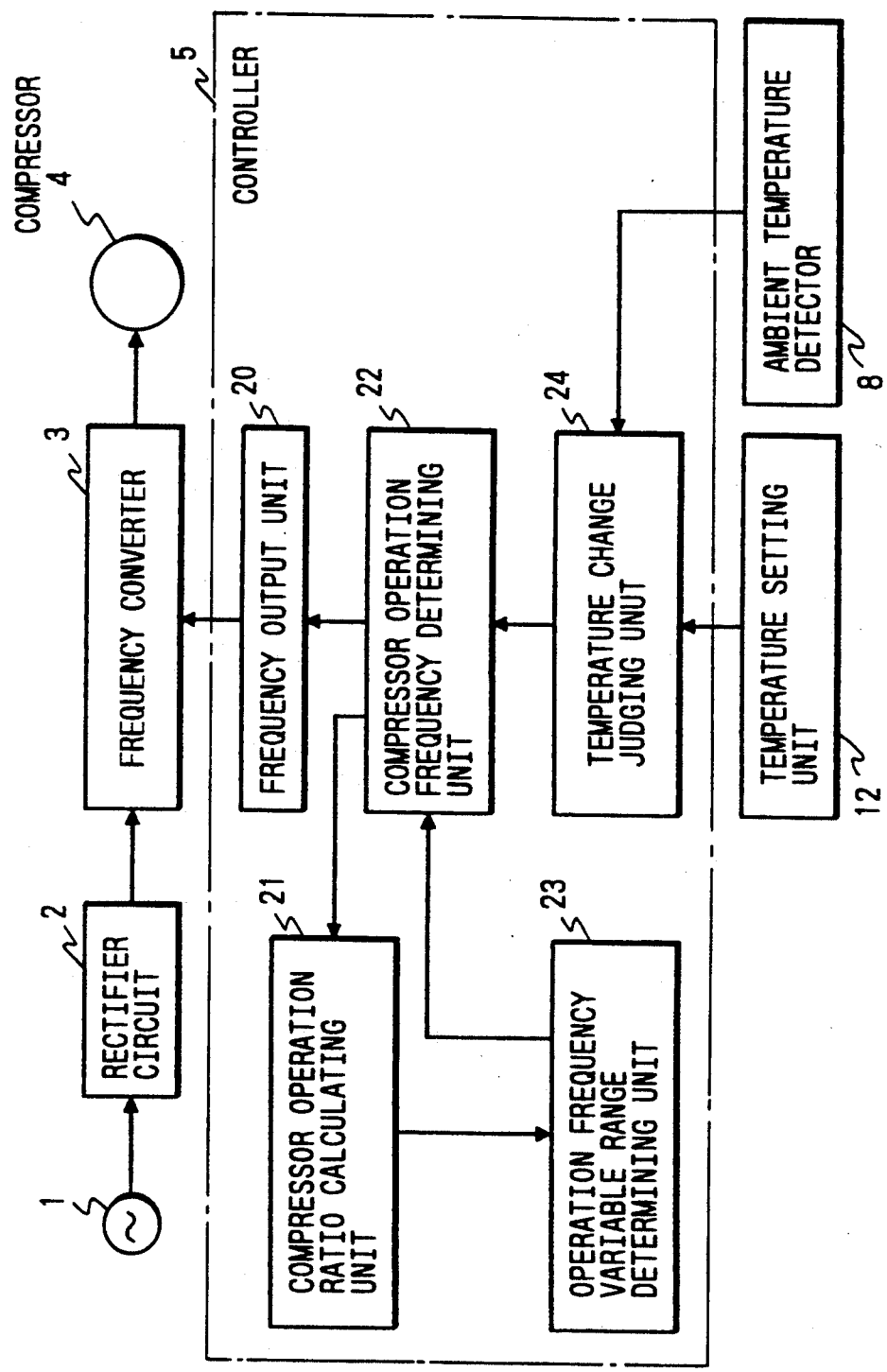
FIG. 1 is a block diagram showing an operation controller for an air conditioner, which is a first embodiment of the invention.
Figure 2:
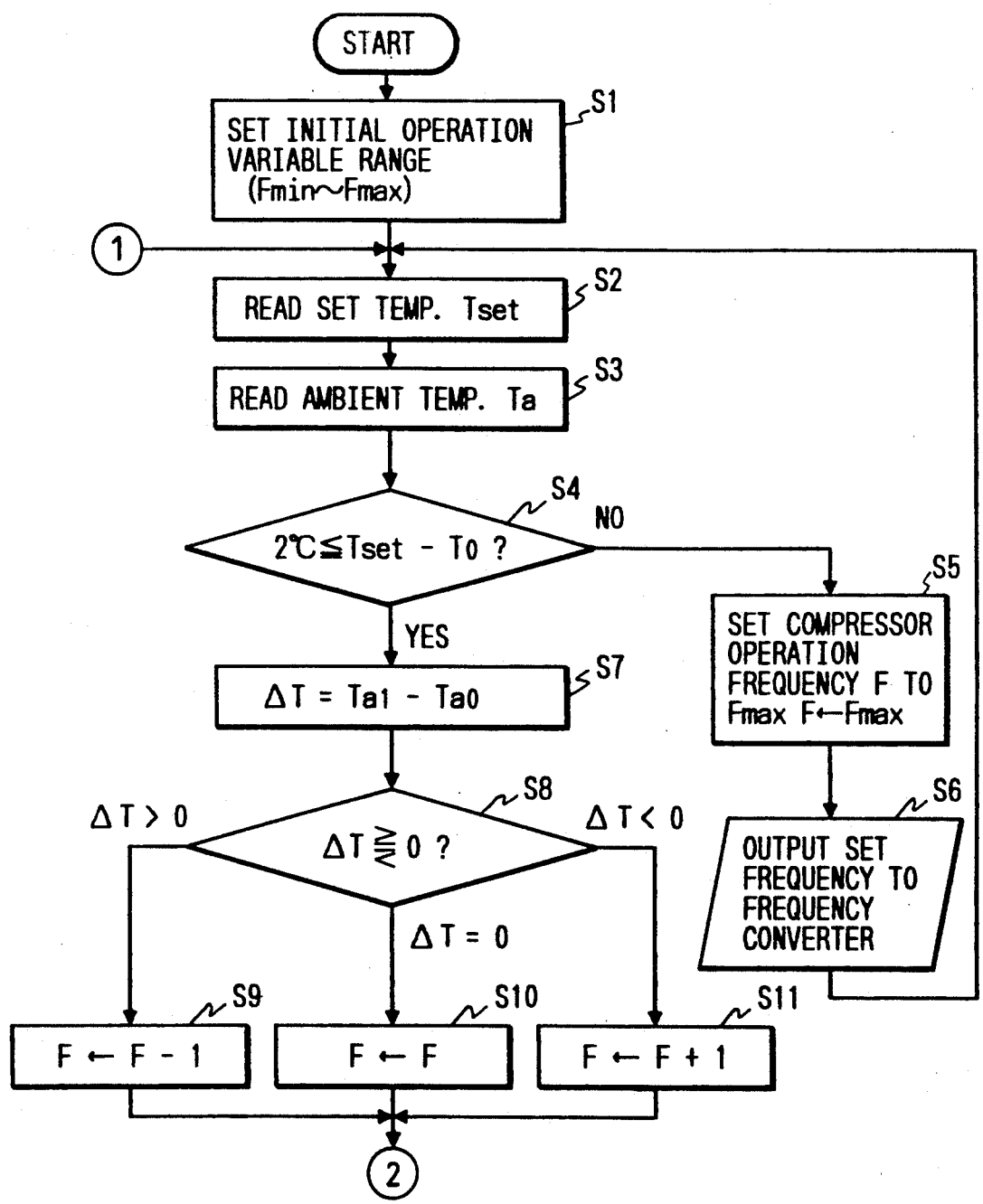
FIG. 2 is a flowchart for the operation of the operation controller for the air conditioner shown in FIG. 1.
Figure 3:
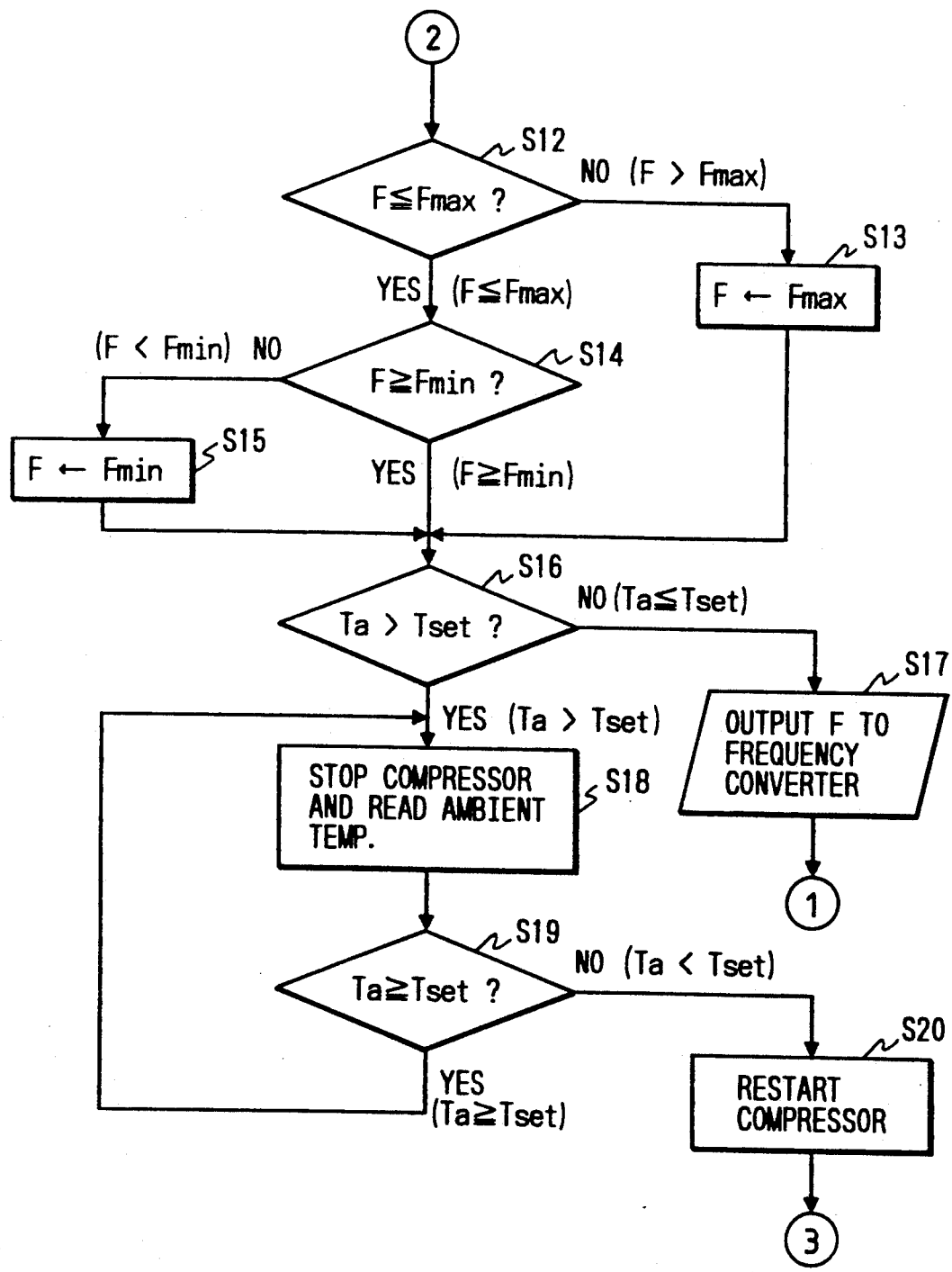
FIG. 3 is a flowchart for the operation of the operation controller for the air conditioner shown in FIG. 1.
Figure 4:
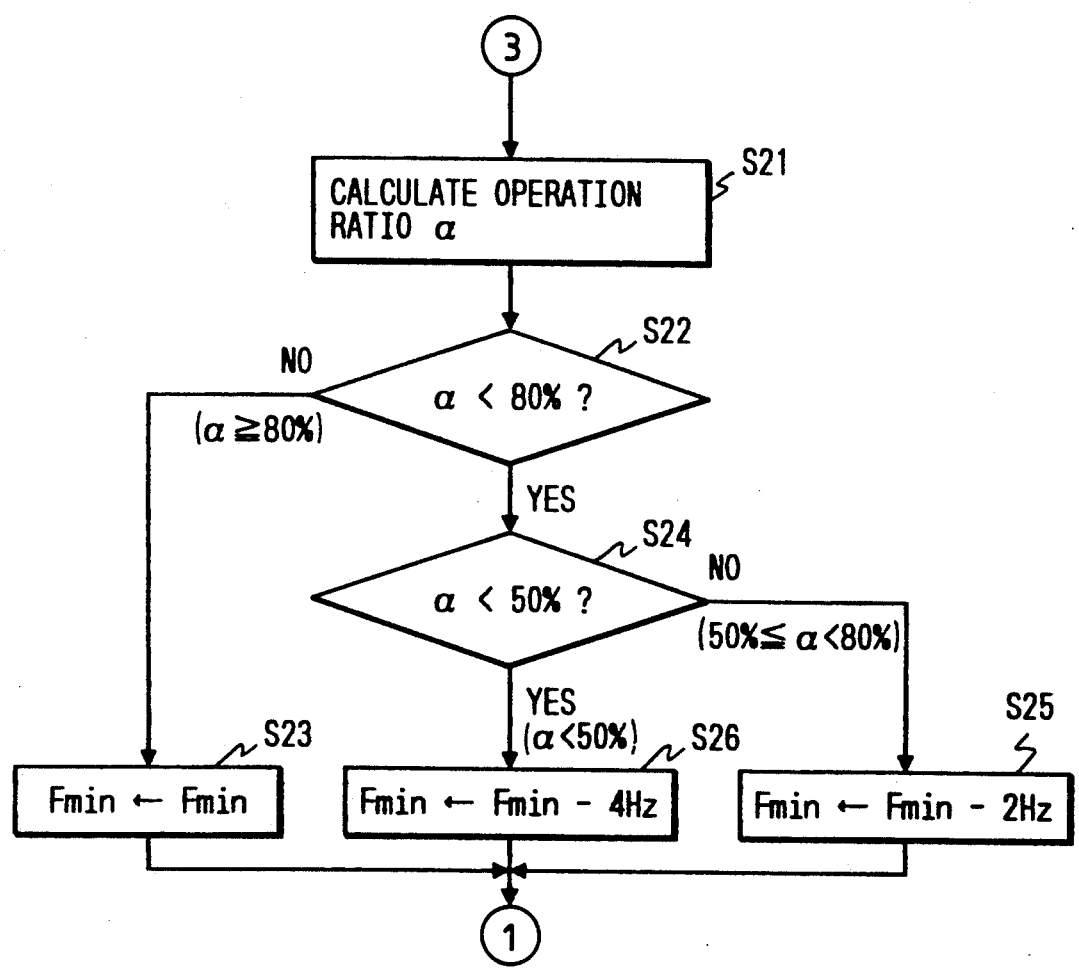
FIG. 4 is a flowchart for the operation controller for the air controller shown in FIG. 1.
Figure 5:
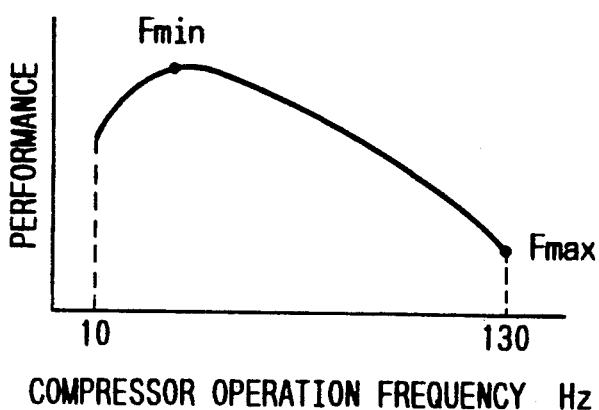
FIG. 5 is a frequency characteristic diagram of the operation controller for the air conditioner shown in FIG. 1.

A first embodiment of the invention will hereunder be described. FIG. 1 is a block diagram roughly showing a configuration of an operation controller for an air conditioner, which is the first embodiment of the invention; FIGS. 2 to 4 are flowcharts for the operation thereof. FIG. 5 is a frequency characteristic diagram of the operation controller for the air conditioner shown in FIG. 1. In FIG. 1, a power supply 1 supplies ac power to a rectifier circuit 2, where the ac power from the power supply 1 is rectified to dc power. The dc power outputted from the rectifier circuit 2 is delivered to a frequency converter 3 that can convert an output frequency continuously in the range of from about 15 to 130 Hz by a digital control signal. As a result, the number of revolutions of a compressor 4 is varied in the range of from 900 to 7800 rpm, achieving a variable capacity. The digital control signal applied to the frequency converter 3 is outputted by a controller 5.

An ambient temperature detector 8 and a temperature setting unit 12 are connected to the controller 5. The ambient temperature detector 8 detects an ambient temperature $T_a$ and outputs a detected ambient temperature signal. The temperature setting unit 12 outputs a set ambient temperature $T_{set}$ set by a user. The controller 5 includes a temperature change judging means 24, a compressor operation ratio calculating means 21, an operation frequency variable range determining means 23, a compressor operation frequency determining means 22, and a frequency output means 20. The temperature change judging means 24 calculates not only a difference between the set temperature $T_{set}$ and the ambient temperature $T_a$ by a difference in the output between the temperature setting unit 12 and the ambient temperature detector 8, but also a change $\Delta T_a$ in temperature difference as a function of time. The compressor operation ratio calculating means 21 calculates an operation ratio $\alpha = t_{on}/(t_{on}+t_{off})$, which is a ratio of an operation time $t_{on}$ to a stop time $t_{off}$ of the compressor 4. The operation frequency variable range determining means 23 regulates a variable range of operation frequencies ($F_{min}$ to $F_{max}$) of the compressor 4 from the result obtained by the compressor operation ratio calculating means 21. The compressor operation frequency determining means 22 determines the compressor operation frequency F and the operation and stop timing of the compressor 4 based on the data of the temperature change judging means 25 and the operation frequency variable range determining means 23. The frequency output means 20 outputs a set frequency signal judged by the compressor operation frequency determining means 22 to the external frequency converter 3. The thus configured controller 5 performs arithmetic and logic operations in accordance with preset programs and feeds the result of the calculation to the frequency converter 3 as the set frequency signal.

A control operation for heating will be described with reference to FIGS. 2 to 5. In Step S1 a minimum frequency $F_{min}$ and a maximum frequency $F_{max}$ defining an initial operation variable range are set in advance, where the minimum frequency $F_{min}$ is the frequency maximizing an efficiency COP (heating capacity/consumed power) shown in FIG. 5 and the maximum frequency $F_{max}$ is the threshold frequency of the frequency converter 3.

In Step S2 a set temperature $T_{set}$ is read, and in Step S3 an ambient temperature $T_a$ is read. In Step S4, whether or not a difference between the set temperature and the ambient temperature ($T_{set}-T_a$) is within 2° C. is judged. That is, it is judged if the ambient temperature has neared the set temperature to some degree. If the difference is greater than or equal to 2° C., the processing proceeds to Step S5, whereas if the difference is less than 2° C., the processing proceeds to Step S7. In Step S5 since the ambient temperature has not yet neared the set temperature, the compressor operation frequency F is set to the maximum frequency $F_{max}$, and the processing proceeds to Step S6. In Step S6 the set frequency is applied to the frequency converter 3, and the processing returns to Step S2.

If the processing jumps to Step S7 from Step S4, i.e., if the ambient temperature has neared the set temperature, then the change $\Delta T$ in ambient temperature as a function of time is calculated. In Step S8 whether or not the change $\Delta T$ in ambient temperature is positive or negative is judged. If the change $\Delta T$ is positive, i.e., the heating capacity is so large for an ambient load that the ambient temperature has been increased, then the compressor operation frequency F is decreased by 1 Hz from the current frequency in Step S9 to reduce the heating capacity. If the heating capacity is zero, i.e., the heating capacity is equal to the ambient load, then the current compressor operation frequency F is maintained in Step S10. If the heating capacity is negative, i.e., the heating capacity is so small for the ambient load that the ambient temperature has been decreased, then the compressor operation frequency F is increased by 1 Hz from the current frequency to increase the heating capacity.

In Step S12 it is judged whether the compressor operation frequency F calculated in Steps S8 to S11 exceeds the maximum frequency $F_{max}$. If F exceeds $F_{max}$, then the compressor operation frequency F is replaced with $F_{max}$ in Step S13, whereas if F does not exceed $F_{max}$, the processing proceeds to Step S14, where it is judged that the compressor operation frequency F is less than the minimum frequency $F_{min}$. If F is less than $F_{min}$, then the compressor operation frequency F is replaced with $F_{min}$ in Step S15, otherwise the processing proceeds to Step S16.

In Step S16 it is judged whether the ambient temperature $T_a$ exceeds the set temperature $T_{set}$. If $T_a$ does not exceed $T_{set}$, the processing proceeds to Step S17. In Step S17 the above-determined compressor operation frequency F is sent to the frequency converter 3, and the processing returns to Step S2. If $T_a$ exceeds $T_{set}$ in Step S16, the processing proceeds to Step S18. In Step S18 the operation of the compressor 4 is stopped, and then an ambient temperature $T_a$ is read again. In Step S19 whether or not the ambient temperature $T_a$ is less than the set temperature $T_{set}$ is judged, and if $T_a$ is not less than $T_{set}$, then the processing returns to Step S18.

And this processing is repeated to stop the operation of the compressor 4 for a while until $T_a$ becomes less than $T_{set}$. Then, the processing proceeds to Step S20 where the compressor 4 is reactivated, and the processing proceeds to Step S21 thereafter. In Step S21 the operation ratio $\alpha$ ($t_{on}/(t_{on}+t_{off})$) is calculated, and the processing proceeds to Step S22.

In Step S22 whether or not the calculated operation ratio $\alpha$ is greater than or equal to 80% is judged. If $\alpha \geq 80\%$, then the processing proceeds to Step S23, where the current minimum frequency is maintained. If $\alpha$ is less than 80%, the processing proceeds to Step S24, where it is judged whether or not the operation ratio $\alpha$ is greater than or equal to 50%. If $\alpha \geq 50\%$ ($50\% \leq \alpha < 80\%$), the current minimum frequency is decreased by 2 Hz to give a new setting in Step S25. If $\alpha$ is less than 50%, the current minimum frequency is decreased by 4 Hz to give a new setting in Step S26. The processing then returns to Step S2. More specifically, the operation of the air conditioner is controlled to balance with the load not only by decreasing the compressor operation frequency as the ambient load becomes smaller, but also by operating and stopping the compressor when the load is smaller than the capacity provided at the minimum frequency. At this point, if the initial value of the minimum frequency is set to a frequency that can maximize the performance constant, and further if the operation ratio is decreased, the minimum frequency may be corrected so as to match the degree of reduction of the operation ratio, so that a highly efficient compressor operation frequency control can be accomplished.

Second Embodiment

Figure 8:
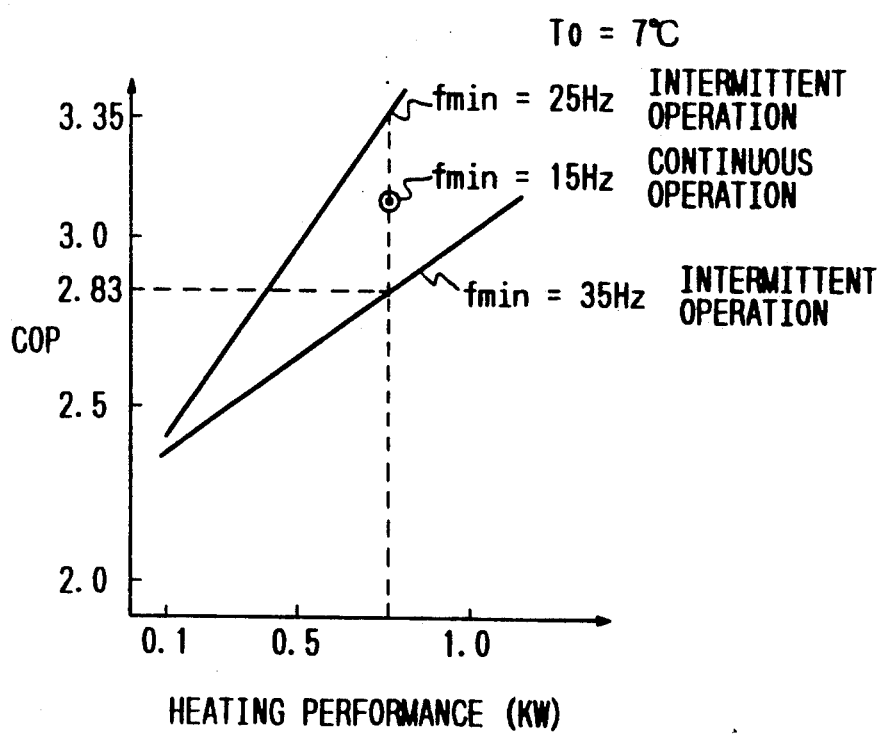
FIG. 8 is a characteristic diagram of the operation controller for the air conditioner shown in FIG. 6.
Figure 6:
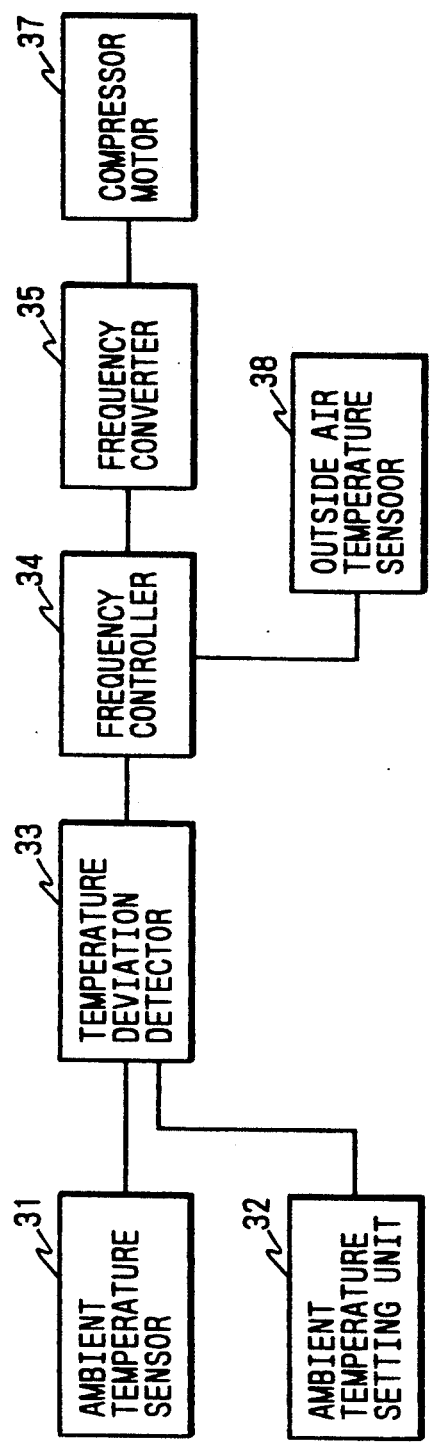
FIG. 6 is a block diagram showing an operation controller for an air conditioner, which is a second embodiment of the invention.
Figure 12:
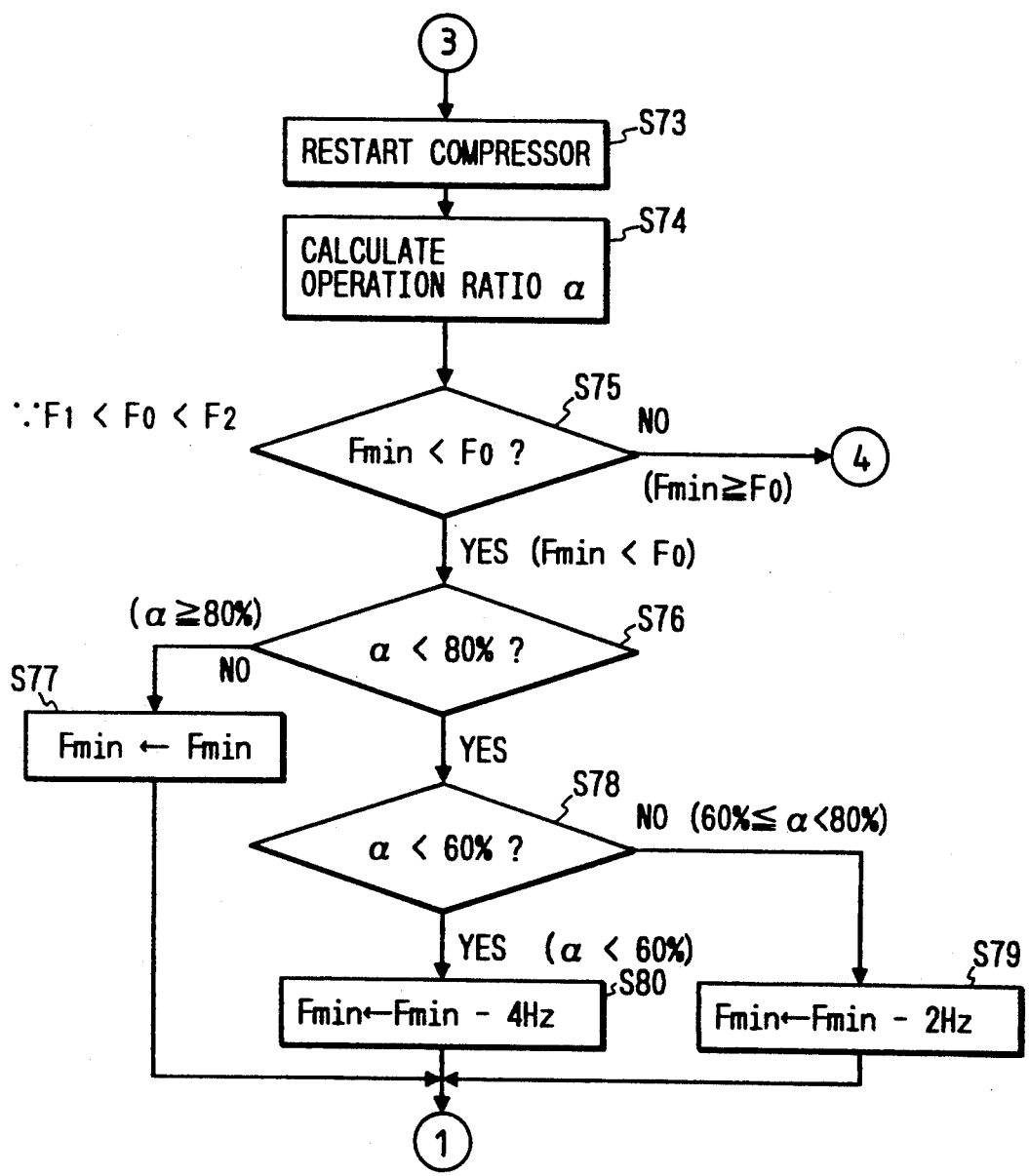
FIG. 12 is a flowchart for the operation of the operation controller for the air conditioner according to the fourth embodiment of the invention.
Figure 13:
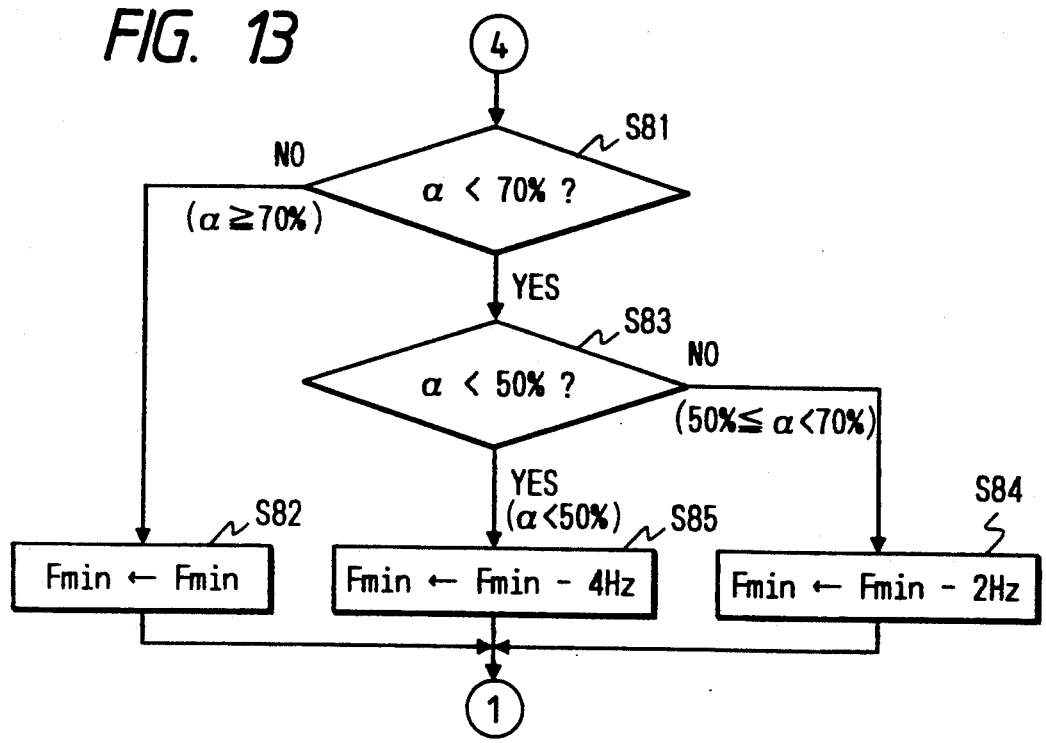
FIG. 13 is a flowchart for the operation of the operation controller for the air conditioner according to the fourth embodiment of the invention.

A second embodiment of the invention will be described with reference to FIGS. 6 to 8. FIG. 6 is a block diagram showing a controller for controlling the number of revolutions of the compressor for an air conditioner, which is the second embodiment; FIG. 7 is a flowchart for the operation of the second embodiment of the invention; and FIG. 8 is a diagram showing effects of heating by the second embodiment. In FIG. 6, reference numeral 31 designates an ambient temperature sensor; 32, an ambient temperature setting unit; 33, a temperature deviation detector that detects the nearing of an ambient temperature to a set temperature; 34, a frequency controller that controls the operation frequency in accordance with a temperature deviation detected by the temperature deviation detector 33 and an outside air temperature detected by an outside air temperature sensor 38; 35, a frequency converter that increases or decreases an output frequency in accordance with a control instruction from the frequency controller 34; and 37, a compressor motor.

The operation of controlling the thus configured air conditioner of the invention will be described with reference to the flowchart shown in FIG. 7. In Step S31 a temperature difference $\Delta T$ between an ambient temperature $T_a$ detected by the ambient temperature sensor 31 and a set temperature $T_s$ is detected by the temperature deviation detector 33. If the ambient temperature has not neared the set temperature, the frequency is increased in Step S32. If the ambient temperature has neared the set temperature, the processing proceeds to Step S33, where it is checked whether a temperature difference $\Delta T$ is less than a predetermined value Tc1. If so, the processing proceeds to Step S34, where the frequency is decreased to $f_{min}$ in accordance with $\Delta T$.

In Step S35 the minimum frequency $f_{min}$ is varied in accordance with an outside temperature To. In Step S36 it is judged whether the operation frequency f has reached the minimum frequency $f_{min}$, and if $f=f_{min}$, the compressor 37 is stopped. In Step S38, since a temperature change occurs due to the compressor 37 having been stopped, it is checked that the difference between the ambient temperature and the set temperature is greater than or equal to a predetermined value $T_{a1}$. If so, the compressor 37 is reactivated in Step S39.

FIG. 8 shows a result of the performance test conducted on the above embodiment when the outside air temperature is 7° C. More specifically, FIG. 8 shows a relationship between the performance with a continuous operation at $f_{min}=15$ Hz (minimum frequency at which the compressor 37 is allowed to rotate) and the performance with an intermittent operation at $f_{min}=25$ Hz and 35 Hz (the frequencies that can achieve the same performance as at 15 Hz). As is understood from this graph, COP=3.1 under the 15 Hz—continuous operation has been improved to COP=3.35 under an intermittent operation with the minimum frequency being set to 25 Hz.

Third Embodiment

While the minimum frequency $f_{min}$ is varied by the outside air temperature $T_o$ detected by the outside air temperature sensor 8 in the second embodiment, a similar operation can be expected from varying the minimum frequency $f_{min}$ by the set temperature $T_s$ in place of the outside air temperature in the third embodiment as shown in FIG. 9.

Fourth Embodiment

Figure 14:
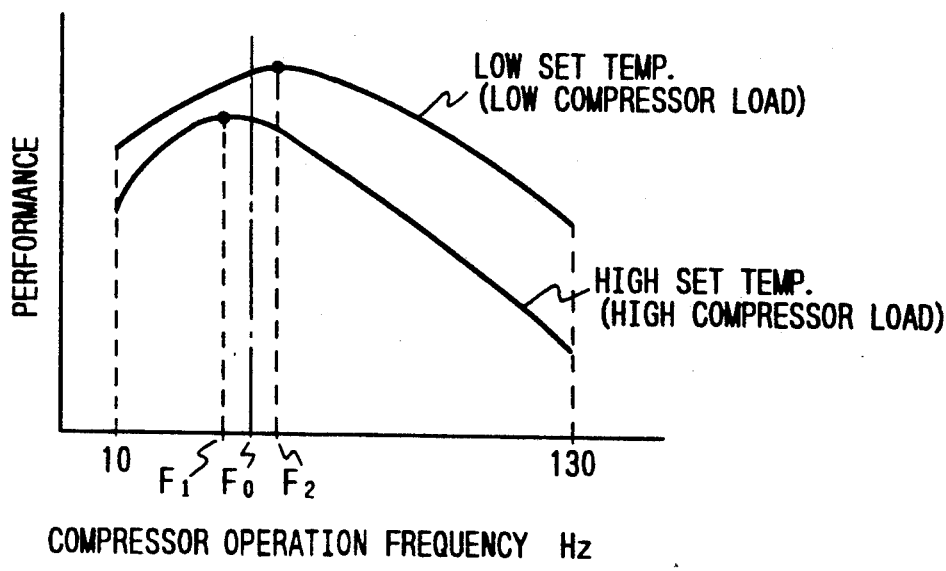
FIG. 14 is a frequency characteristic diagram showing a relationship between an operation frequency and a performance constant of the operation controller for the air conditioner according to the fourth embodiment of the invention.

A control operation for heating in a fourth embodiment of the invention will be described with reference to FIGS. 10 to 14. In Step S51 a set temperature $T_{set}$ is read. In Step S52 it is judged whether or not the set temperature $T_{set}$ is higher than a predetermined judgment reference temperature $T_1$, and if $T_{set} < T_1$, then the minimum frequency $F_{min}$ is set to $F_2$ in Step S54. If $T_{set} \geq T_1$, the minimum frequency $F_{min}$ is set to $F_1$ in Step S53. The values $F_1$, $F_2$ are set so that the efficiencies COP (heating capacity/consumed power) are maximized when the ambient temperature is high and low, respectively, as shown in FIG. 14.

In Step S55 an ambient temperature $T_a$ is read, and the processing proceeds to Step S56. In Step S56 it is judged whether or not a difference between the set temperature and the ambient temperature ($T_{set}-T_a$) is within 2° C., i.e., whether or not the ambient temperature has neared the set temperature to some degree is judged. If the difference is greater than or equal to 2° C., the processing proceeds to Step S58, whereas if the difference is less than 2° C., the processing proceeds to Step S57. After Step S58, the processing continues to proceed to Step S59, where a compressor 4 is driven at the maximum frequency $F_{max}$, which is the threshold frequency of the frequency converter 3, since the ambient temperature has not yet neared the set temperature. When the processing has proceeded to Step S57 from Step S56, i.e., if the ambient temperature has neared the set temperature, then a change $\Delta T$ in ambient temperature as a function of time is calculated in Step S57. In Step S60 it is judged whether $\Delta T$ is positive or negative. If $\Delta T$ is positive, i.e., the temperature is increased because the heating capacity is greater than an ambient load, then the processing proceeds to Step S61 to decrease the heating capacity by decreasing the current compressor operation frequency F by 1 Hz. If $\Delta T$ is equal to zero, i.e., the heating capacity is equal to the ambient load, then the processing proceeds to Step S62 to maintain the current frequency F. If $\Delta T$ is negative, i.e., the temperature is decreased because the heating capacity is less than the ambient load, then the processing proceeds to Step S63 to increase the heating capacity by increasing the current frequency F by 1 Hz.

In Step S64 whether or not the frequency F calculated in Steps S60 to S63 exceeds the maximum frequency $F_{max}$ is judged. If F exceeds $F_{max}$, the frequency F is replaced with $F_{max}$ in Step S65. If the frequency F is less than $F_{min}$ in Step S66, the frequency F is replaced with $F_{min}$ in Step S67. Therefore, a relationship of $F_{min} \leq F \leq F_{max}$ is established at all times.

In Step S68 whether or not the ambient temperature $T_a$ exceeds the set temperature $T_{set}$ is judged. If $T_a$ does not exceed $T_{set}$, the processing proceeds to Step S69, where the determined frequency F is applied to the frequency converter 3. Then, the processing returns to Step S51.

If the ambient temperature $T_a$ exceeds the set temperature $T_{set}$ in Step S68, the compressor 4 is stopped in Step S70. In Step S71 an ambient temperature $T_a$ is read again, and whether or not the ambient temperature $T_a$ is higher than the set temperature $T_{set}$ is judged in Step S72. If $T_a \geq T_{set}$, then the processing returns to Step S70. This processing is repeated to continuously stop the compressor 4. If the ambient temperature $T_a$ is lower than the set temperature $T_{set}$, the compressor 4 is reactivated in Step S73, and the processing then proceeds to Step S74.

In Step S74 the operation ratio $\alpha$ ($t_{on}/(t_{on}+t_{off})$) is calculated. In Step S75 whether or not $F_{min}$ at which the compressor 4 has been stopped is greater than a predetermined judgment reference frequency $F_0(F_1 < F_0 < F_2)$ is judged. If $F_{min} < F_0$, the processing proceeds to Step S76, whereas if $F_{min} \geq F_0$, then the processing proceeds to Step S81.

In Step S76 whether or not the operation ratio $\alpha$ calculated in Step S74 is greater than or equal to 80% is judged. If $\alpha \geq 80\%$, the processing proceeds to Step S77, where the current minimum frequency $F_{min}$ is maintained. If $\alpha < 80\%$, the processing proceeds to Step S78, where whether or not $\alpha$ is greater than 60% is judged. If $\alpha \geq 60\%$ ($60\% \leq \alpha < 80\%$), the current minimum frequency is decreased by 2 Hz to given a new setting in Step S79. If $\alpha < 60\%$, the current minimum frequency $F_{min}$ is decreased by 4 Hz to given a new setting in Step S80. Then, the processing returns to Step S51.

On the other hand, in Step S81 whether or not the operation ratio $\alpha$ calculated in Step S74 is greater than or equal to 70% is judged. If $\alpha \geq 70\%$, the processing proceeds to Step S82, where the current minimum frequency $F_{min}$ is maintained. If $\alpha < 70\%$, the processing proceeds to Step S83, where whether or not $\alpha$ is greater than 50% is judged. If $\alpha \geq 50\%$ ($50\% \leq \alpha < 70\%$), the current minimum frequency is decreased by 2 Hz to given a new setting in Step S84. If $\alpha < 50\%$, the current minimum frequency $F_{min}$ is decreased by 4 Hz to given a new setting in Step S85. Then, the processing returns to Step S51.

Fifth Embodiment

Figure 15:
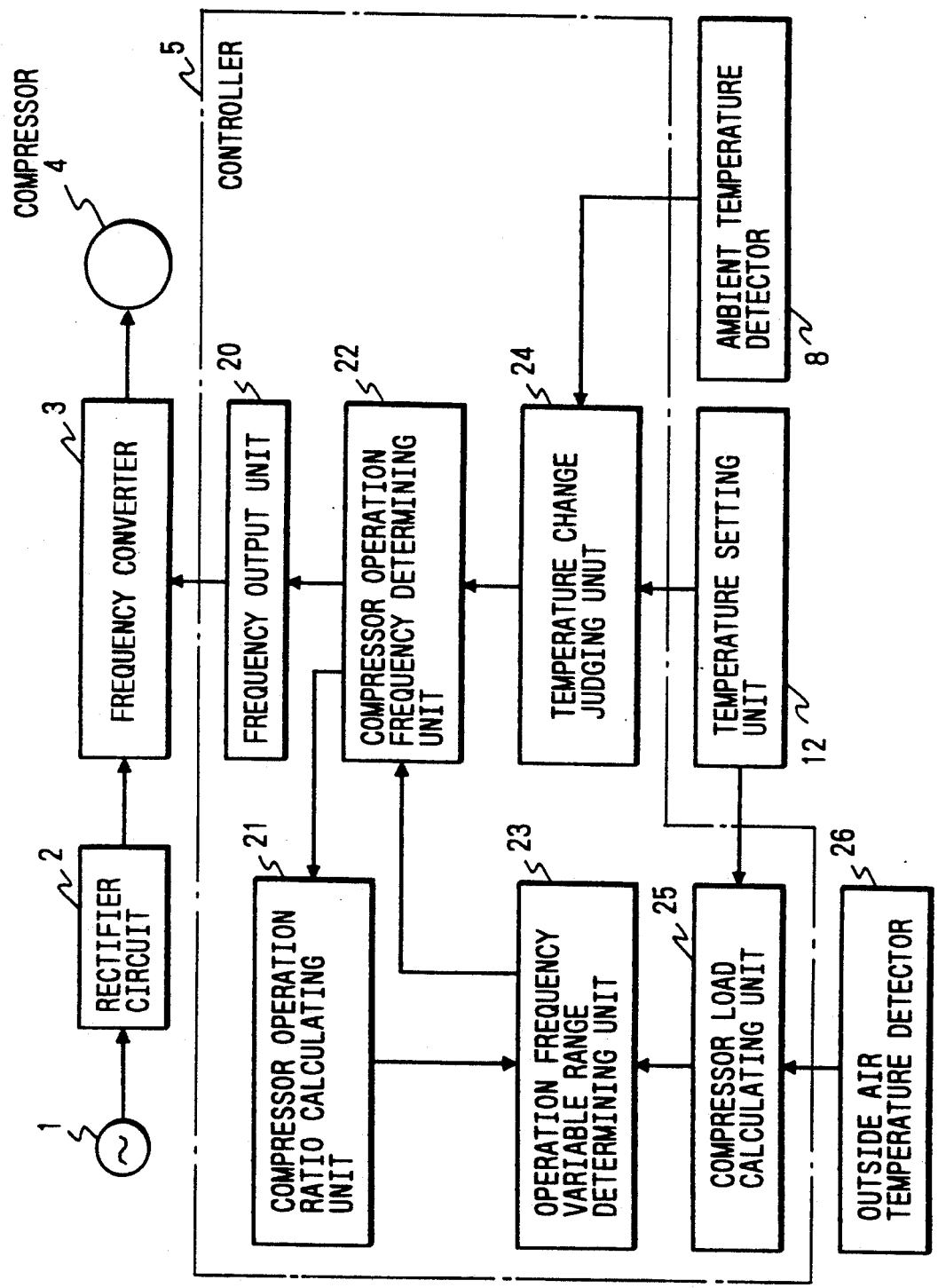
FIG. 15 is a block diagram showing an operation controller for an air conditioner, which is a fifth embodiment of the invention.
Figure 16:
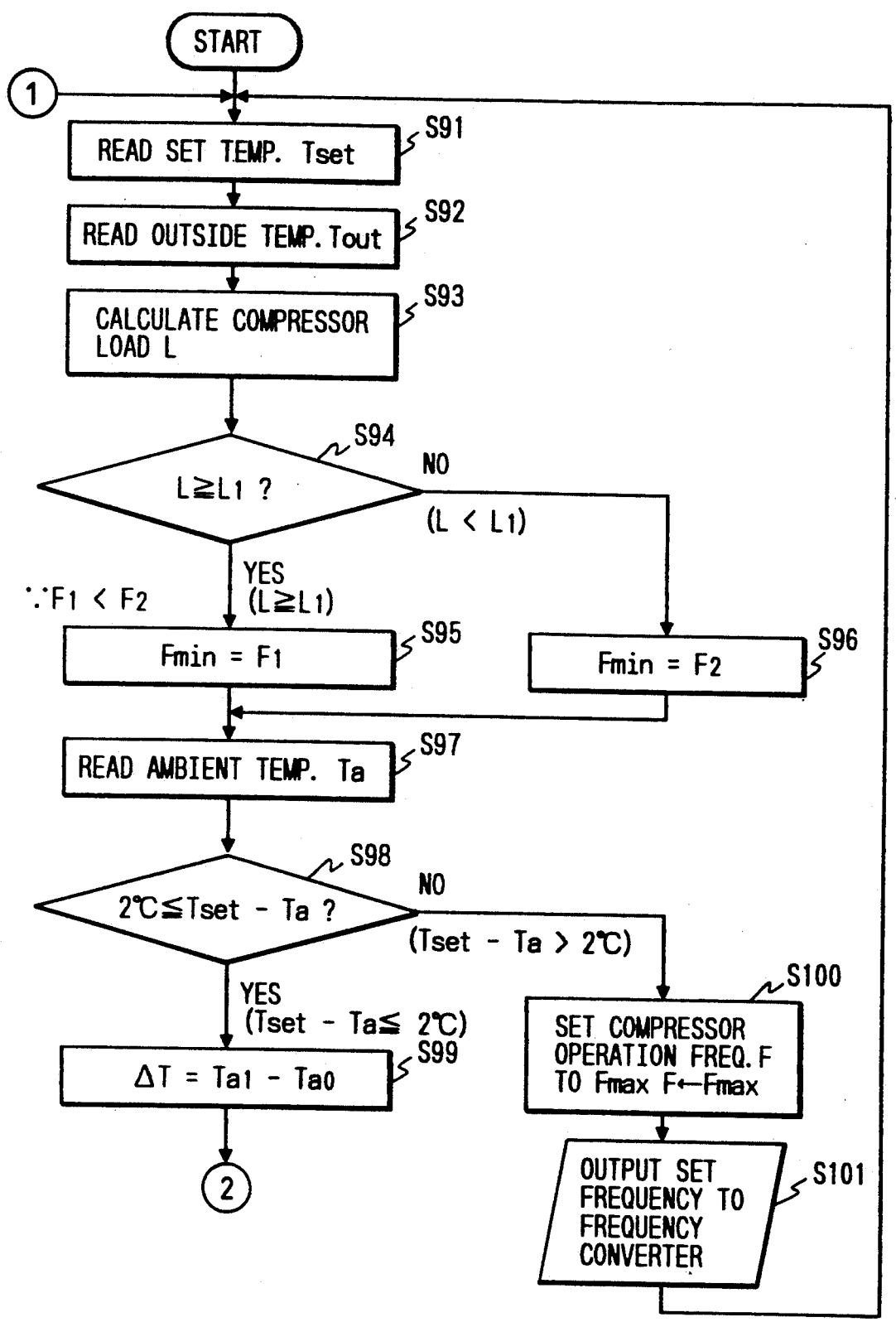
FIG. 16 is a flowchart for the operation of the operation controller for the air conditioner shown in FIG. 15.
Figure 17:
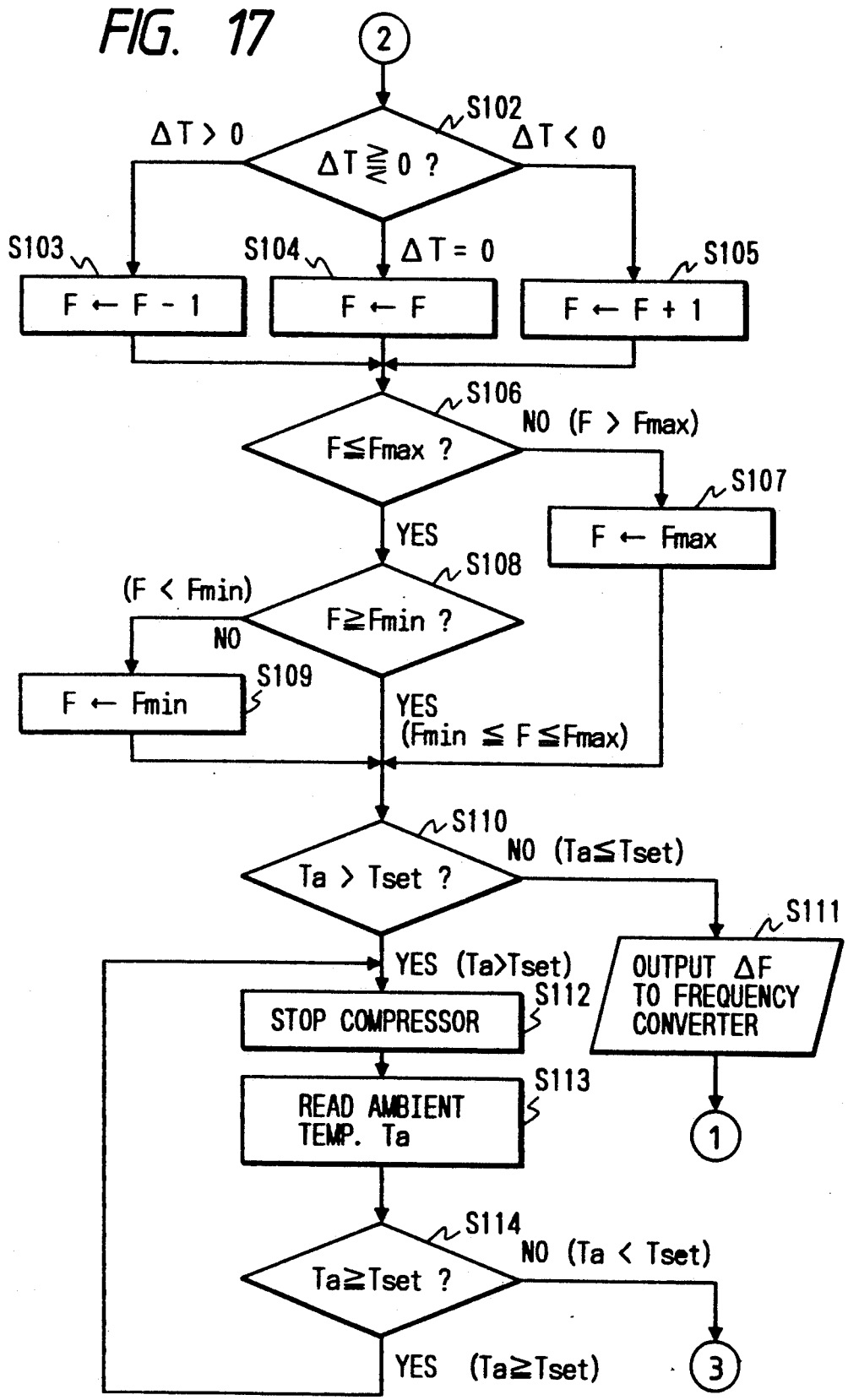
FIG. 17 is a flowchart for the operation of the operation controller for the air conditioner shown in FIG. 15.
Figure 18:
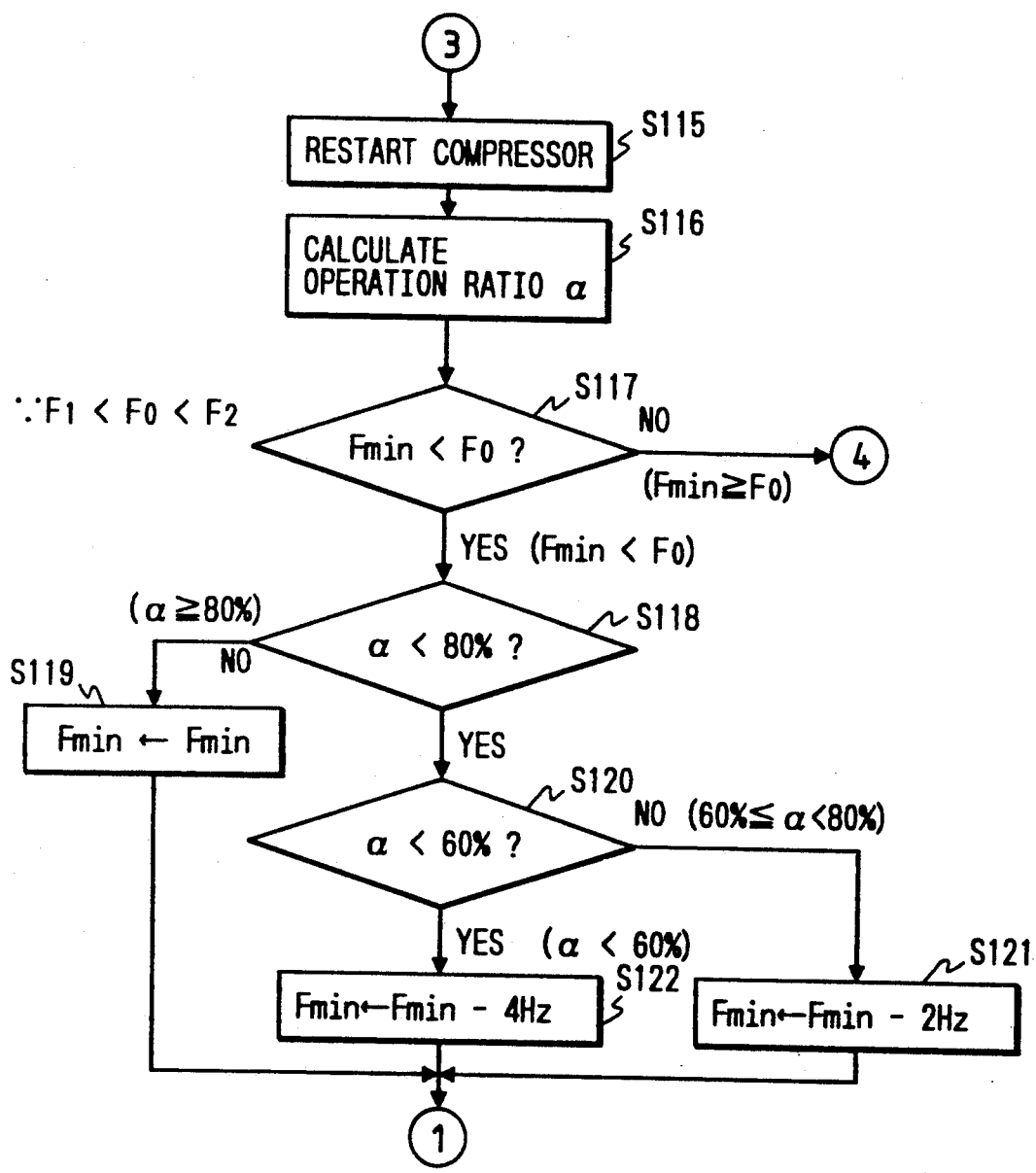
FIG. 18 is a flowchart for the operation of the operation controller for the air conditioner shown in FIG. 15.
Figure 19:
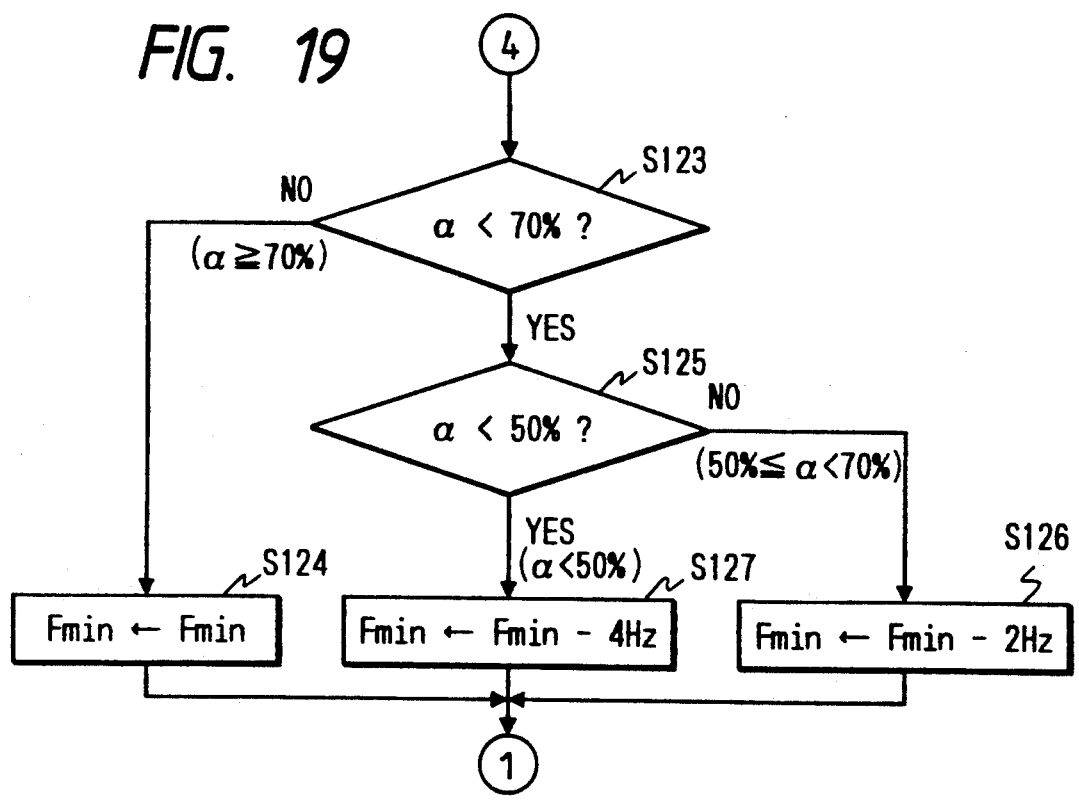
FIG. 19 is a flowchart for the operation of the operation controller for the air conditioner shown in FIG. 15.
Figure 20:
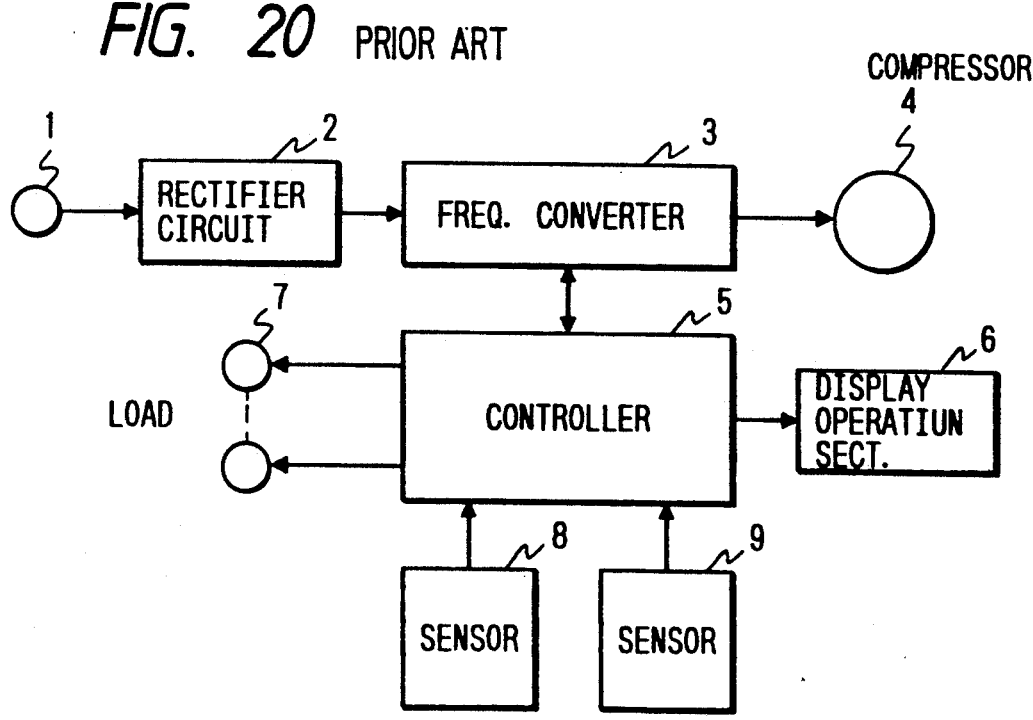
FIG. 20 is a block diagram showing an operation controller for a conventional air conditioner.
Figure 21:
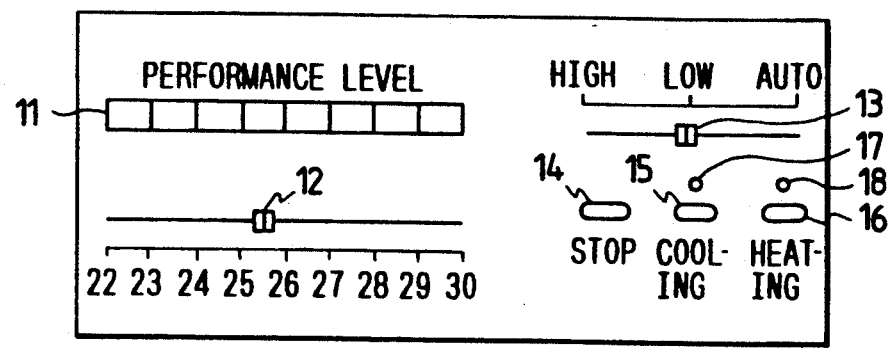
FIG. 21 is a front view of a display operation panel of the operation controller for the conventional air conditioner.
Figure 22:
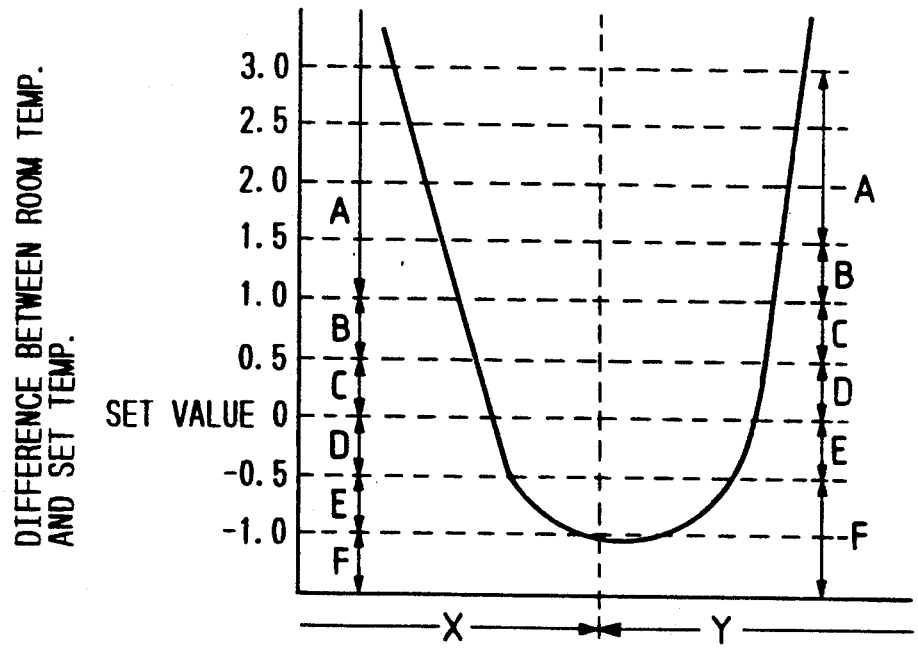
FIG. 22 is a characteristic diagram of the operation controller for the conventional air conditioners.
Figures 23, 24:
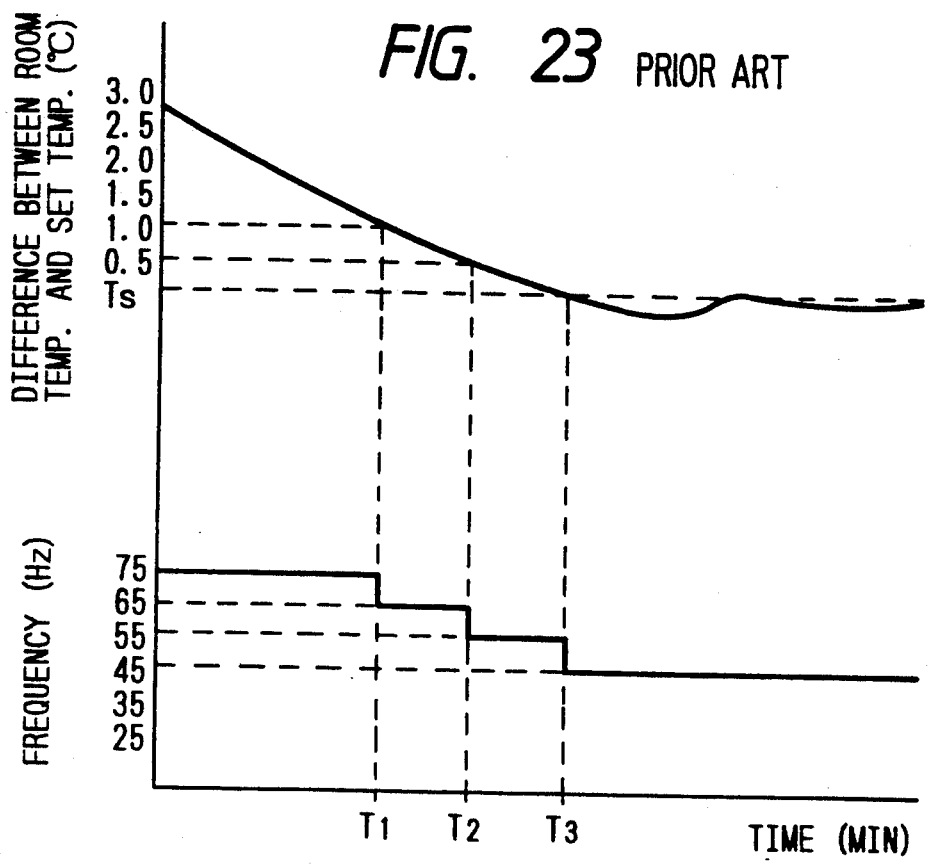
FIG. 23 is a time chart for the operation controller for the conventional air conditioner.
FIG. 24 is a diagram showing a correspondence between temperature ranges and set frequency values of the conventional air conditioner.

The two maximum values $F_1$, $F_2$ at which the efficiency of the minimum frequency is high are employed in accordance with the set temperature $T_{set}$, which is a signal from the temperature setting unit 12, in the fourth embodiment. As shown in FIG. 15, an effect similar to that of the fourth embodiment can be obtained by adding to the operation controller for the air conditioner according to the fourth embodiment a newly provided outside air temperature detector 26, a compressor load calculating means 25, a modified operation frequency variable range determining means 23 and by operating such newly configured controller in a manner described below. The outside air temperature detector 26 detects an outside air temperature Tout and outputs the detected outside air signal. The compressor load calculating means 25 estimates in the controller 5 a load L of the compressor 4 for output signals from the temperature setting unit 12 and the outside air temperature detector 26. The operation frequency variable range determining means 23 controls the range of varying the operation frequency of the compressor 4 by the results obtained from the compressor operation ratio calculating means 21 and the compressor load calculating means 25.

A control operation for heating in the fifth embodiment will be described with reference to FIGS. 16 to 19. In Step S91 a set temperature $T_{set}$ is read, and in Step S92 an outside air temperature Tout is read. In Step S93 the load L of the compressor 4 is estimated from the set temperature $T_{set}$ and the outside air temperature Tout. In Step S94 whether or not the estimated load L is higher than a predetermined judgment reference load $L_1$ is judged. If $L \geq L_1$, the minimum frequency $F_{min}$ is set to $F_1$ in Step S95. If $L < L_1$, the minimum frequency $F_{min}$ is set to $F_2$ in Step S96. The values $F_1$, $F_2$ are similarly set so that the efficiencies COP become maximized when the load is high and low, respectively. Steps S97 to 126 are the same as those in the fourth embodiment.

The invention provides the following advantages.

The operation controller for an air conditioner according to the first aspect of the invention, which is designed to vary the number of revolutions of a compressor in such a manner as to decrease the difference between the ambient temperature and the set temperature, includes a compressor operation ratio calculating means that calculates the operation ratio of the compressor, and an operation frequency variable range determining means that changes the range of varying the operation frequency of the compressor based on the operation ratio. Therefore, the compressor can be operated at the maximum efficiency at all times.

The operation controller for an air conditioner according to the second aspect of the invention, the air conditioner having an invertor-driven compressor, includes a control means that changes the minimum operation frequency of the compressor based on the outside air temperature. Therefore, the economic operation can be achieved at the same capacity while maintaining comfort by controlling the minimum frequency so that the COP can be optimized.

The operation controller for an air conditioner according to the third aspect of the invention includes a means for calculating the operation ratio of a compressor, a means for not only selecting the minimum frequency but also correcting the selected minimum frequency so that the operation ratio is optimized for the minimum frequency. Therefore, not only minimum frequencies providing optimal efficiencies in accordance with various operation conditions can be set, but also an operation ratio suitable to an operation frequency can be maintained because to prevent the deterioration of the efficiency due to reduction in operation ratio. As a result, air-conditioning at the highest efficiency can be achieved at all times.

What is claimed is:

1. An operation controller for an air conditioner, for controlling an operation frequency of a compressor of the air conditioner so that a difference between an ambient temperature and a set temperature can be decreased, comprising:

means for initially setting a minimum frequency and a maximum frequency at which the compressor will operate;

means for calculating an operation ratio of said compressor, said operation ratio representing a proportion of time that the compressor is operating; and means for resetting the minimum frequency at which the compressor will operate based on the calculated operation ratio.

2. The operation controller according to claim 1, further comprising:

means for comparing the calculated operated ratio with first and second predetermined values, the first predetermined value being greater than the second predetermined value, and wherein the minimum frequency is reset based on the comparisons of the calculated operation ratio with the first and second predetermined values.

3. The operation controller according to claim 2, wherein when the calculated operation ratio is greater than the first predetermined value, the minimum frequency at which the compressor will operate is not reset, wherein when the calculated operation ratio is less than the first predetermined value, but greater than the second predetermined value, the minimum frequency at which the compressor will operate is decreased by a third predetermined value, and wherein when the calculated operation ratio is less than the second predetermined value, the minimum frequency at which the compressor will operate is decreased by a fourth predetermined value.

4. The operation controller according to claim 3, wherein the first predetermined value is 80% and the second predetermined value is 50%.

5. The operation controller according to claim 3, wherein the third predetermined value is 2 Hz and the fourth predetermined value is 4 Hz.

6. The operation controller according to claim 4, wherein the third predetermined value is 2 Hz and the fourth predetermined value is 4 Hz.

7. A method for controlling of an air conditioner, for controlling an operation frequency of a compressor of the air conditioner so that a difference between an ambient temperature and a set temperature can be decreased, comprising the steps of:

setting an initial minimum frequency and an initial maximum frequency at which the compressor will operate;

calculating an operation ratio of said compressor, said operation ratio representing a proportion of time that the compressor is operating; and resetting the minimum frequency at which the compressor will operate based on the calculated operation ratio.

8. The method according to claim 7, further comprising the step of:

comparing the calculated operation ratio with first and second predetermined values, the first predetermined value being greater than the second predetermined value, and wherein the minimum frequency is reset based on the comparisons of the calculated operation ratio with the first and second predetermined values.

9. The method according to claim 8, wherein when the calculated operation ratio is greater than the first predetermined value, the minimum frequency at which the compressor will operate is not reset, wherein when the calculated operation ratio is less than the first predetermined value, but greater than the second predetermined value, the minimum frequency at which the compressor will operate is decreased by a third predetermined value, and wherein when the calculated operation ratio is less than the second predetermined value, the minimum frequency at which the compressor will operate is decreased by a fourth predetermined value.

10. The method according to claim 9, wherein the first predetermined value is 80% and the second predetermined value is 50%.

11. The method according to claim 9, wherein the third predetermined value is 2 Hz and the fourth predetermined value is 4 Hz.

12. The method according to claim 10, wherein the third predetermined value is 2 Hz and the fourth predetermined value is 4 Hz.

* * * * *